United States Patent [19]

Yoshida

[11] Patent Number: 4,573,173
[45] Date of Patent: Feb. 25, 1986

[54] CLOCK SYNCHRONIZATION DEVICE IN DATA TRANSMISSION SYSTEM

[75] Inventor: Tadahiro Yoshida, Kawasaki, Japan

[73] Assignee: Nitsuko Limited, Kawasaki, Japan

[21] Appl. No.: 618,410

[22] Filed: Jun. 6, 1984

[30] Foreign Application Priority Data

Jun. 6, 1983 [JP] Japan .................................. 58-100628

[51] Int. Cl.$^4$ .............................................. H04L 7/00
[52] U.S. Cl. ....................................... 375/118; 328/63;
370/108; 375/110
[58] Field of Search ............... 375/111, 106, 110, 118;
370/108, 100; 328/63, 75, 130.1

[56] References Cited

U.S. PATENT DOCUMENTS 4,119,796 10/1978 Jones .................................... 375/118
4,208,724 6/1980 Rattlingourd ........................ 375/118
4,400,666 8/1983 Sekiguchi ............................. 328/75

Primary Examiner—Marc E. Bookbinder
Assistant Examiner—M. Huseman
Attorney, Agent, or Firm—Roberts, Spiecens & Cohen

[57] ABSTRACT

A circuit for obtaining a clock pulse synchronized to a data signal received at a receiving side, which has a plurality of clock pulses having a repetition frequency equal to that of a clock in a transmission side but being different from one another in phase. On reception of the first data bit of the received data signal, the timing of the first data bit is detected at a detection circuit in reference to the plurality of clock pulses. According to the detected timing, a selector circuit selects one of the plurality of clock pulses with a predetermined constant phase difference from the received data signal.

The detection circuit comprises D-type flip-flops, and the selector circuit comprises AND gates.

6 Claims, 4 Drawing Figures

CLOCK SYNCHRONIZATION DEVICE IN DATA TRANSMISSION SYSTEM

BACKGROUND OF THE INVENTION (1) Field of the invention

The present invention relates to a data transmission system and in particular, to a circuit device for obtaining a clock pulse synchronized to a data signal received at a receiving side.

(b 2) Description of the Prior Art

In a data transmission system such as a time division PCM data transmission system, the data signal is produced at and transmitted from a transmitting side under control of a clock pulse having a constant repetition frequency. A receiving side also uses a clock pulse for obtaining data from the received signal. The clock pulse of the receiving side must be synchronized to the received data signal.

In transmission of a data signal from a transmitting side to a receiving side through a transmission cable, the clock pulse of the receiving side is not synchronous to the data signal received at the receiving side due to the difference in clock phase between the transmitting side and the receiving side as well as the propagation delay of the data signal on the transmission cable.

SUMMARY OF THE INVENTION

It is an object of the present invention to provide a circuit for obtaining a clock pulse synchronized to a digital data signal received at a receiving side wherein the synchronization of clock pulse at the receiver side to the received data signal is established upon reception of the first data bit of the data signal.

The present invention provides a circuit for obtaining a first clock pulse synchronized to a data signal received at a receiving side in a data transmission system, the data signal being transmitted from a transmitting side under control of a second clock pulse having a constant repetition frequency, which comprises; first means for generating a predetermined number (n) of pulse signals having a repetition frequency equal to the second clock pulse, then n pulse signals being equiangularly spaced from one another in pulse phase; second means having n pulse input terminals for receiving the n pulse signals from the first means, respectively, a data input port for receiving the digital data signal, and n output terminals corresponding to the n pulse input terminals, respectively, the second means selecting one of the n output terminals corresponding to one of the n pulse input terminals to which a pulse is inputted at first after the second means receives a first data bit signal from the data input port, and sending out a selection signal to the selected one of the n output terminals continuously; and third means having n terminals receiving the n pulse signals from the first means, respectively, n input terminals coupled with the n output terminals of the second means and corresponding to the n receiving terminals, respectively, and a clock output terminal, the third means selecting one of the n pulse signals on one of the n receiving terminals corresponding to one of the n input terminals on which the selection signal is inputted from the second means and outputs the selected pulse signal from the clock output terminal, whereby the first clock pulse synchronized to the received data signal is obtained from the clock output terminal.

Further objects, features and other aspect of the present invention will be understood from the following detailed description of preferred embodiments of the present invention referring to the accompanying drawings.

DETAILED DESCRIPTION OF PREFERRED EMBODIMENTS

Figure 1:
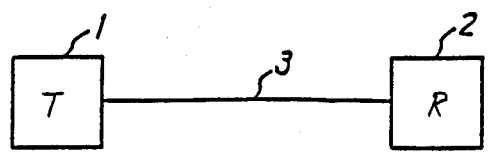
FIG. 1 is a diagrammatic view illustrating a data transmission system to which the present invention is applied.

Referring to FIG. 1, a data transmission system to which the present invention is applied comprises a data signal transmission apparatus 1, a data signal receiving apparatus 2, and a data transmission cable 3 connecting the transmission apparatus 1 and the receiving apparatus 2.

The circuit device of the present invention is used at the receiving apparatus 2 for synchronizing the clock pulse in the receiving apparatus 2 to the data signal received thereat.

Figure 2:
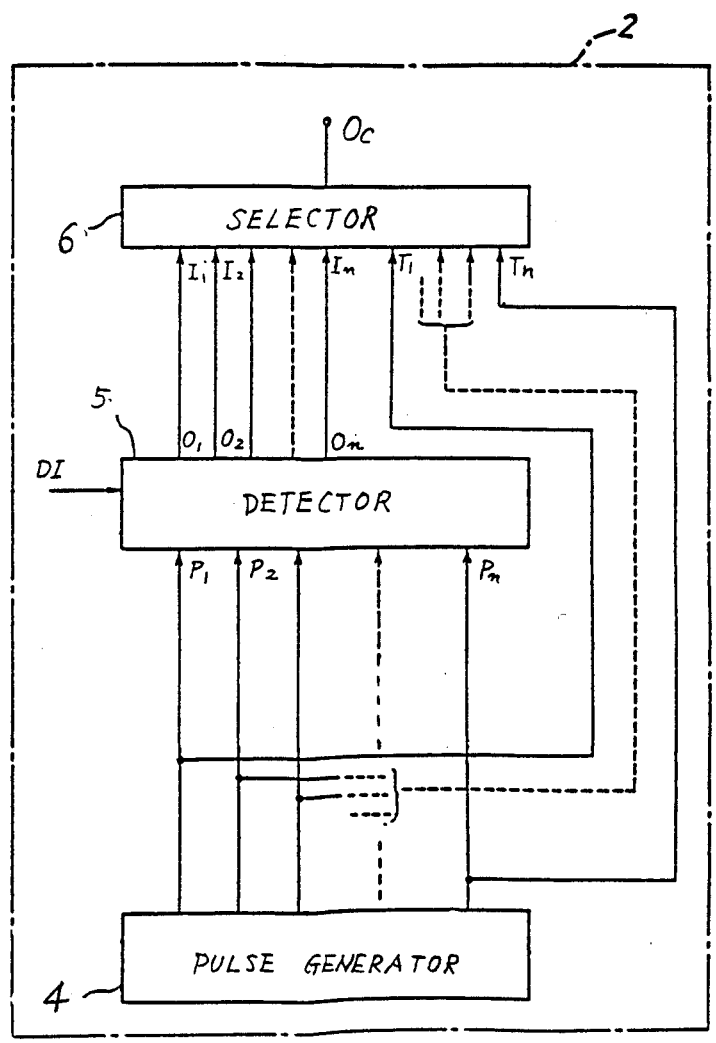
FIG. 2 is a block diagram view of an embodiment of the present invention.

Referring to FIG. 2, a circuit device according to the present invention is shown therein. In the FIG., 4 represents a pulse generator providing n (positive integer larger than 1) pulse signals having a repetition frequency equal to a clock pulse in the transmitting apparatus (1 in FIG. 1). 5 represents a detector circuit, which has n pulse input terminals $P_1-P_n$ for receiving the n pulse signals from pulse generator 4, respectively, a data input port DI for receiving the digital data signal received at the receiving apparatus, and n output terminals $O_1-O_n$ corresponding to n pulse input terminals $P_1-P_n$, respectively.

Detector circuit 5 selects one of n output terminals $O_1-O_n$ corresponding to one of n pulse input terminals $P_1-P_n$ to which a pulse is inputted at first after the detector circuit receives a first data bit "1" through data input port DI, and sends out a selection signal to the selected one of the output terminals.

6 represents a selector circuit which has n terminals $T_1-T_n$ for receiving n pulse signals from pulse generator 4, respectively, n input terminals $I_1-I_n$ coupled with n output terminals $O_1-O_n$ of detector circuit 5, respectively, and a clock output terminal $O_c$.

Selector circuit 6 selects one of n pulse signals on one of receiving terminals $T_1-T_n$ corresponding to one of n input terminals $I_1-I_n$ on which the selection signal is inputted from detector circuit 5, and outputs, the selected pulse signal from clock output terminal $O_c$.

In the arrangement of FIG. 2, when the first data bit of the received data sigal is inputted to detection circuit 5, timing of the received data signal is detected by detection circuit 5 in connection with n pulse signals which have a constant repetition frequency but are different in pulse phase. According to the detected timing, selector circuit 6 selects a pulse signal which has a predetermined phase relation with the timing. As a result, a clock pulse synchronized to the received data signal is obtained from selection circuit 6.

Figure 3:
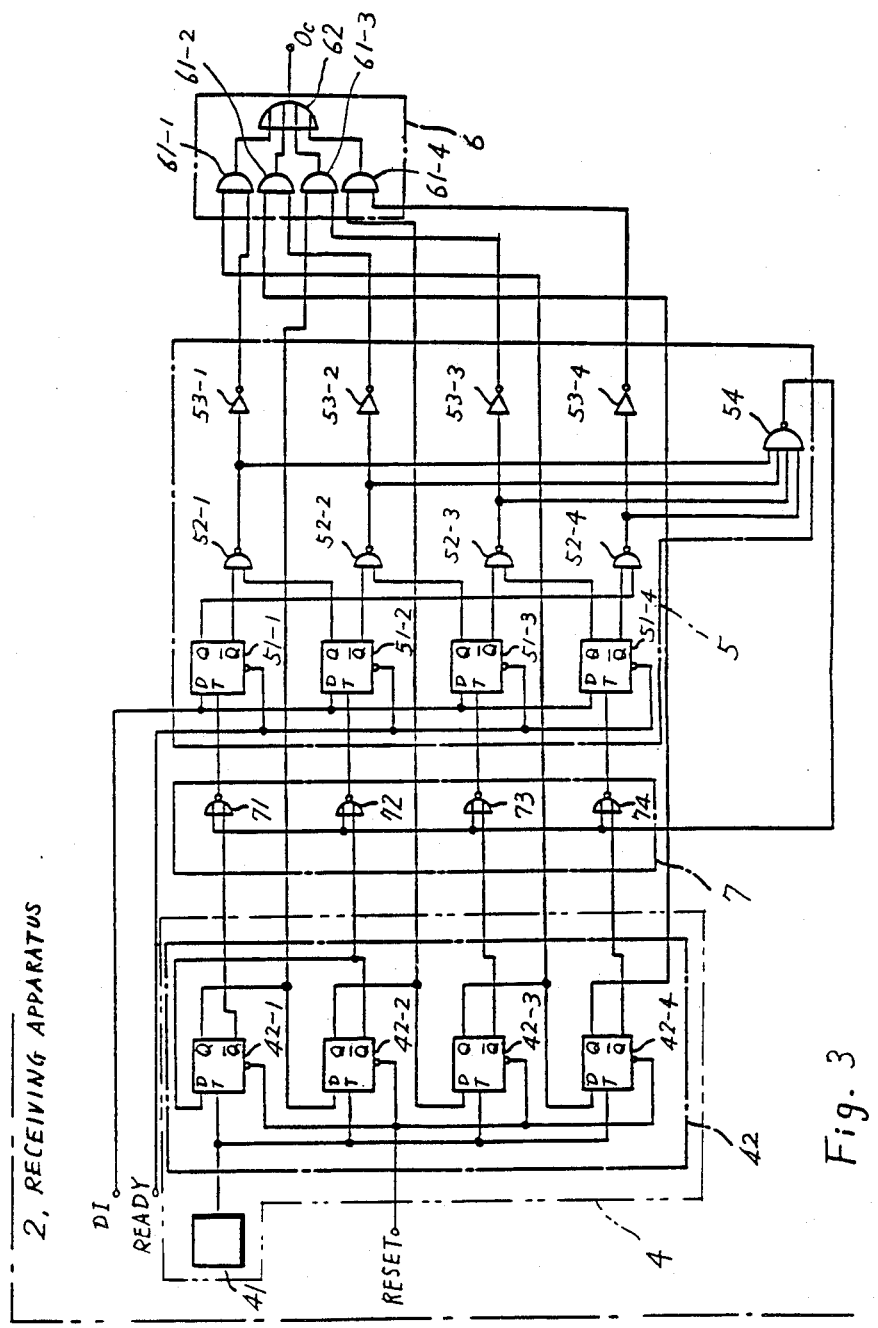
FIG. 3 is a circuit diagram view of another embodiment.

Referring to FIG. 3, a further concrete embodiment is shown therein. In FIG. 3, the same reference numerals represent similar parts of FIG. 2. 41 represents a puls oscillator which generates a pulse signal having a repetition frequency four times of the clock in the transmission side. 42 represents a divider which is composed of four delayed flip-flops or D-type flip-flops (DEF) 42-1–42-4.

Divider 42 divides the repetition frequency of the pulse signal from pulse oscillator 41 and provides four pulse signals having a repetition frequency of one fourth ($\frac{1}{4}$) of the pulse signal from pulse oscillator 41. The divided four pulse signals are different in phase by $\pi/2$ from another, and are outputted from Q-terminals of DFFs 42-1–42-4. Another four pulse signals of the same repetition frequency but inverted in phase are outputted from $\overline{Q}$-terminals of DFFs 42-1–42-4.

7 is a gate circuit which is composed of four NOR gates 71–74. NOR gates 71–74 receive the inverted pulse signals from Q-terminals of DFFs 42-1–42-4.

Detector circuit 5 comprises four DFFs 51-1–51-4, four NAND gate 52-1–52-4, and four inverters 53-1–53-4. Detector circuit 5 is also provided with another NAND gate 54 for controlling gate circuit 7.

DEFs 51-1–51-4 receive the respective outputs of NOR gates 71–74. Two input terminals of NAND gate 52-1 are connected to an output terminal $\overline{Q}$ of DFF 51-1 and an output terminal Q of DFF 51-2. Similarly, NAND gate 52-2 are connected to the output terminal $\overline{Q}$ of DEF 51-2 and an output terminal Q of DFF 51-3, NAND gate 52-3 connected to and output terminal $\overline{Q}$ of DFF 51-3 and an output terminal Q of DFF 51-4, and NAND gate 52-4 to an output terminal $\overline{Q}$ of DFF 51-4 and an output terminal Q of DFF 51-1.

NAND gate 54 has four input terminals which are connected to outputs of NAND gate 52-1–52-4, respectively. The output of NAND gate 54 is connected to the other input terminals of NOR gates 71–74.

Outputs of NAND gates 52-1–52-4 are connected to input terminals of inverters 53-1–53-4, respectively.

Selector circuit 6 comprises four AND gates 61-1–61-4, and an OR gate 62.

Two input terminals of AND gate 61-1 are connected to the output of inverter 53-1 and the output terminal Q of DFF 42-3. Similarly, AND gate 61-2 is connected to the output of inverter 53-2 and the output terminal Q of DFF 42-4, AND gate 61-3 connected to the output of inverter 53-3 and the output terminal Q of DFF 42-1, and AND gate 61-4 to the output of inverter 53-4 and the output terminal Q of DFF 42-2.

OR gate 62 has four input terminals which are connected to the output of four AND gates 61-1–61-4. The output of OR gate 62 is connected to clock output terminal $O_c$.

Data input port DI is connected to respective input terminals D of DFFs 51-1–51-4.

In FIG. 3, a terminal READY is an input terminal for receiving a signal for clearing DFFs 51-1–51-4, which is generated in the receiving apparatus, and another terminal RESET is an input terminal for receiving a signal for clearing DFFs 42-1–42-4.

Next, operation of the circuit device of FIG. 3 will be described referring to FIG. 4.

At first, DFFs 42-1–42-4 and DFFs 51-1–51-4 are cleared by the signals through RESET and READY terminals.

Figure 4:
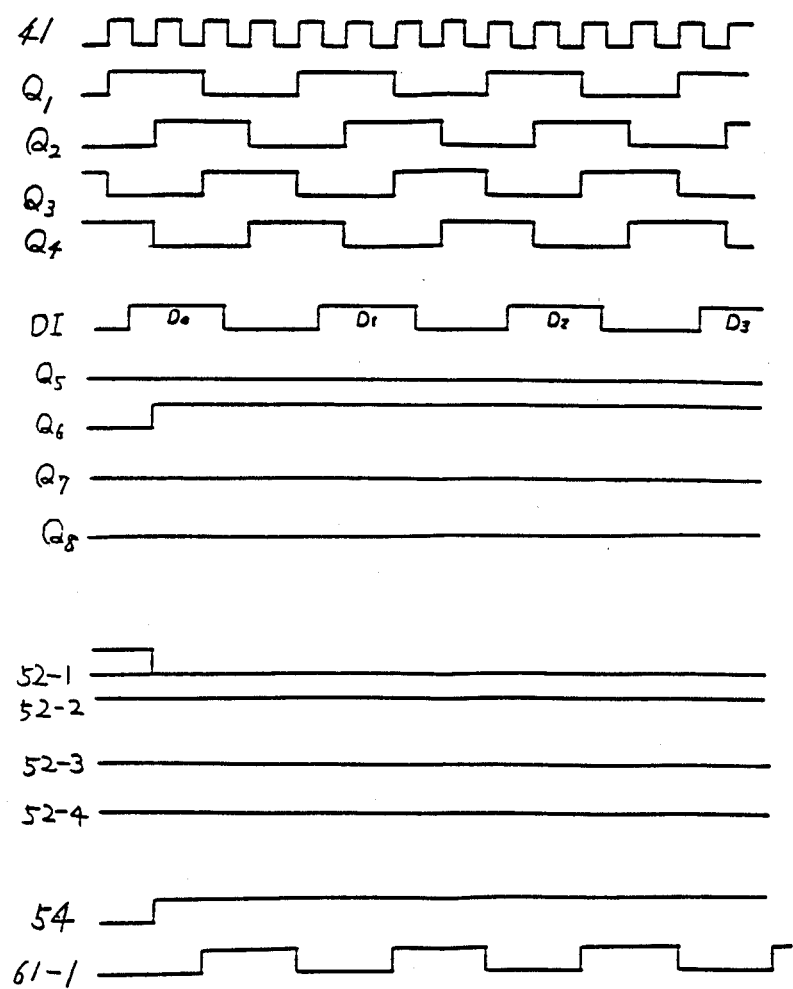
FIG. 4 is a view illustrating waveforms of various portions in FIG. 3.

When a pulse signal, as shown at 41 in FIG. 4, is supplied to DFFs 42-1–42-4 from pulse oscillator 41, four divided pulse signals are provided from output terminals Q of DFFs 42-1–42-4, and are different from one another in phase by 90° ($=\pi 2$), as shown at $Q_1$-$Q_4$ in FIG. 4.

On the other hand, the inverted pulse signals are obtained on output terminals $\overline{Q}$ of DFF 42-1–42-4, and are provided to NOR gate 71–74, respectively.

When DFFs 51-1–51-4 are cleared, high level signals are presented at respective output terminals Q of DFFs 51-1–51-4, as shown at $Q_5$-$Q_8$ in FIG. 4, while low level signals at output terminals $\overline{Q}$. Therefore, all NAND gates 52-1–52-4 provide high level signals, as shown at 52-1–52-4 in FIG. 4. As a result, NAND gate 54 provides a low level signal as shown in 54 in FIG. 4. The low level is applied to NOR gate 71–74, so that the inverted pulse signals from output terminals $\overline{Q}$ of DFFs 42-1–42-4 are inverted at NOR gates 71–74 respectively, and the pulse signals similar to $Q_1$-$Q_4$ of FIG. 4 are applied to DFFs 51-1–51-4, respectively.

Now, providing that the first data bit "1" $D_O$ is inputted through data input port DI to DFFs 51-1–51-4 in the timing between two pulse signals $Q_1$ and $Q_2$ having a phase difference of 90°, as shown in FIG. 4, the description will be made hereinafter.

Then, the signal at output terminal Q of DFF 51-2 shifts from the low level to the high level on reception of a pulse through NOR gate 72, as shown at $Q_6$ in FIG. 4. As a result, the output signal of NAND gate 52-1 changes from the high level to the low level, as shown at 52-1 in FIG. 4, and therefore, the output signal of NAND gate 54 changes from the low level to the high level, as shown at 54 in FIG. 4. Thus, the outputs of all NOR gates 71–74 are maintained to be the low level. Accordingly, DFFs 51-1–51-4 do not respond to data signal inputted thereafter. That is, DFFs 51-1, 51-3 and 51-4 provide low level signals at their Q output terminals, while DFF 51-2 provides a high level signal continuously, as shown at $Q_5$-$Q_8$ in FIG. 4.

Then, the output of inverter 53-1 changes from the low level signal to the high level signal, while the outputs of all the other inverters 53-2–53-4 are maintained to be low level signals.

AND gate 61-1 is opened by the high level signal from inverter 53-1, and the pulse signal $Q_3$ from DFF 42-3 passes through AND gate 61-1 to OR gate 62, as shown at 61-1 in FIG. 4. The other AND gate 62-2–62-4 are not opened. Then, the $Q_3$ pulse is provided to the clock output terminal $O_c$ through OR gate 62.

Thus, the clock pulse having a constant phase difference from the received data signal can be obtained from the terminal $O_C$.

The above description has been made in connection with an example where the first data bit of the received data signal is inputted in the timing between $Q_1$ pulse and $Q_2$ pulse. As will be easily unerstood, if the first data bit arrive in the timing between $Q_2$ pulse and $Q_3$ pulse, $Q_4$ pulse is obtained as a synchronized pulse, while it arrives in the timing between $Q_3$ pulse and $Q_4$ pulse, $Q_1$ pulse is obtained, and it arrives in the timing between $Q_4$ pulse and $Q_1$ pulse $Q_2$ pulse is obtained.

After the completion of a data transmission, all DFFs 51-1–51-4 can be cleared by the clear signal through the READY terminal. This results in a new data receiving state.

If it is desired to obtain a clock pulse synchronized to the received data signal with a different constant phase difference, it will be easily understood that the connection of outputs of DFFs 42-1–42-4 and AND gate 62--62-4 is changed.

What is claimed is:

1. A circuit for obtaining a first clock pulse synchronized to a data signal received at a receiving side in a data transmission system, the data signal being sent out from a transmitting side under control of a second clock pulse having a constant repetition frequency, which comprises;

first means for generating a predetermined number (n) of pulse signals having a repetition frequency equal to said second clock pulse, said n pulse signals being equiangularly spaced from one another in pulse phase;

second means having n pulse input terminals for receiving said n pulse signals from said first means, respectively, a data input port for receiving said data signal, and n output terminals corresponding to said n pulse input terminals respectively, said second means selecting one of said n output terminals corresponding to one of said n pulse input terminals to which a pulse is inputted at first after said second means receives a first data bit signal from said data input port, and sending out a selection signal to said selected one of said n output terminals continuously; and third means having n terminals receiving said n pulse signals from said first means, respectively, n input terminals coupled with said n output terminals of said second means and corresponding to said n receiving terminals, respectively, and a clock output terminal, said third means selecting one of said n pulse signals on one of said n receiving terminals corresponding to one of said n input terminals on which said selection signal is inputted from said second means and outputs the selected pulse signal from said clock output terminal, whereby said first clock pulse synchronized to the received data signal is obtained from said clock output terminal.

2. The circuit as claimed in claim 1, wherein said first means comprises a pulse oscillator generating a first pulse signal having a repetition frequency n times of the second clock pulse, and a frequency divider receiving the first pulse signal from said pulse oscillator and generating second n pulse signals with a repetition frequency of $1/n$ of the repetition frequency of the first pulse signal, said second n pulse signals being different from one another in phase by $\pi/n$.

3. The circuit as claimed in claim 2, wherein said frequency divider comprises n delayed flip-flops having Q output terminals outputting said second n pulse signals, respectively, and $\overline{Q}$ output terminals outputting phase-inverted signals in connection with said Q output terminals, respectively.

4. The circuit as claimed in claim 1, which further comprises gate means to control application of said n pulse signals to said second means, said second means outputting a gate control signal at a time when said selector signal is outputted, said gate control signal closing said gate means.

5. The circuit as claimed in claim 1, wherein said third means comprises n AND gates and an OR gate, each one of said n AND gates being connected to each one of said n output terminals of said second terminals and being coupled to each one of said n pulse signals, said OR gate being coupled with outputs of all of said n AND gates, an output of said OR gate being coupled with said clock output terminal.

6. The circuit as claimed in claim 4, wherein said second means comprises n delayed flip-flops which receives said n pulse signals from said first means through said gate means, respectively, said delayed flip-flops being commonly connected to said data input port DI each one of said n delayed flip-flop having an output terminal and an inverted output terminal, n NAND gates each having two input terminals connected to said output terminal of each one of said n delayed flip-flops and said inverted output terminal of another one of said n delayed flip-flops, n inverters being converted to said n NAND gates, respectively, said n output terminals being led out from said n inverters, respectively.

* * * * *